(12) United States Patent
Weber et al.

(10) Patent No.: US 8,664,314 B2
(45) Date of Patent: Mar. 4, 2014

(54) MIXTURES OF N-ALKANOLS AND THEIR USE

(75) Inventors: Dieter Weber, Hassloch (DE); Ulrich Metzger, Mannheim (DE)

(73) Assignee: BASF SE (DE)

( * ) Notice: Subject to any disclaimer, the term of this patent is extended or adjusted under 35 U.S.C. 154(b) by 626 days.

(21) Appl. No.: 12/527,872

(22) PCT Filed: Feb. 20, 2008

(86) PCT No.: PCT/EP2008/052066
§ 371 (c)(1),
(2), (4) Date: Aug. 20, 2009

(87) PCT Pub. No.: WO2008/101956
PCT Pub. Date: Aug. 28, 2008

(65) Prior Publication Data
US 2010/0056683 A1    Mar. 4, 2010

(30) Foreign Application Priority Data

Feb. 23, 2007 (EP) .................................... 07003746

(51) Int. Cl.
*C08K 5/05* (2006.01)
(52) U.S. Cl.
USPC .......................................... 524/379; 524/385

(58) Field of Classification Search
USPC .................................................. 524/379, 385
See application file for complete search history.

(56) References Cited

U.S. PATENT DOCUMENTS

| | | | |
|---|---|---|---|
| 4,132,691 A | 1/1979 | Ejk | |
| 4,544,694 A | 10/1985 | Bower | |
| 5,663,156 A * | 9/1997 | Granja et al. | 514/164 |
| 2005/0267091 A1 | 12/2005 | Berlin | |
| 2006/0020044 A1 | 1/2006 | Berlin | |

FOREIGN PATENT DOCUMENTS

| | | |
|---|---|---|
| CA | 2507333 A1 | 11/2005 |
| EP | 0335239 A2 | 10/1989 |
| EP | 0900821 A1 | 3/1999 |
| EP | 1595916 A1 | 11/2005 |
| JP | 03269041 A * | 11/1991 |

OTHER PUBLICATIONS

Machine translation of JP 03269041 A.*

* cited by examiner

*Primary Examiner* — Ling Choi
*Assistant Examiner* — Wenwen Cai
(74) *Attorney, Agent, or Firm* — Novak Druce Connolly Bove + Quigg LLP

(57) ABSTRACT

Use of mixtures, comprising a total of at least 50% by weight of n-alkanols, selected from n-$C_{24}$-$C_{34}$ alkanols, as additive in the processing of thermoplastic polymers.

7 Claims, No Drawings

MIXTURES OF N-ALKANOLS AND THEIR USE

CROSS-REFERENCE TO RELATED APPLICATIONS

This application is a national stage application (under 35 U.S.C. §371) of PCT/EP2008/052066, filed Feb. 20, 2008, which claims benefit of European application 07003746.0, filed Feb. 23, 2007.

BACKGROUND OF THE INVENTION

The present invention relates to the use of mixtures, comprising a total of at least 50% by weight of n-alkanols, selected from n-$C_{24}$-$C_{34}$ alkanols, as additive in the processing of thermoplastic polymers.

When thermoplastic polymers are processed, for example via mixing rolls, and in particular via extrusion with the aid of, for example, foil extruders, or single-screw extruders or twin-screw extruders, or planetary mills, various processing aids are added as a function of the polymer to be processed. For example, in the case of polypropylene it is usual to add antiblocking agents. In the case of polyvinyl chloride (PVC) it is usual to add numerous processing aids, in particular one or more lubricants.

The processing aid(s) used must usually satisfy a series of demanding requirements. For example, processing aids are intended not only to ease processing and to be easy to feed. They are also intended not to cause any disadvantageous side-effects in the relevant polymer, an example being plate-out. In the case of transparent plastics, haze is an undesired side-effect to be avoided. Finally, processing aids are intended to be capable of easy large-scale production.

U.S. Pat. No. 4,132,691 discloses use of partially oxidized polyethylene wax for the processing of PVC, and specifically as lubricant. Partially oxidized polyethylene wax generally, however, leads to haze in the processed polymer, making the relevant polymer rather unsuitable for uses where transparency is important.

BRIEF SUMMARY OF THE INVENTION

The invention relates to a process for the processing of a thermoplastic polymer which comprises utilizing an additive mixture in the processing of the thermoplastic polymer wherein the mixture comprises a total of at least 50% by weight of n-$C_{24}$-$C_{34}$ alkanols.

An object was therefore to provide substances which can be used in the processing of thermoplastic polymers, in particular of PVC, and which aid the processing of polymers. Another object was to provide a method for processing of thermoplastic polymers. Finally, an object was to provide processed thermoplastic polymers, in particular those having high transparency.

DETAILED DESCRIPTION OF THE INVENTION

Accordingly, the use as defined in the introduction has been found of mixtures comprising a total of at least 50% by weight, preferably at least 85% by weight, of n-alkanols, selected from n-$C_{24}$-$C_{34}$ alkanols.

A process has also been found for the processing of thermoplastic polymers using mixtures which comprise at least 50% by weight, preferably at least 85% by weight, of n-alkanols selected from $C_{24}$-$C_{34}$ alkanols.

Data in % by weight here are always based on the total amount of mixture.

The abovementioned mixtures, which are also termed alkanol mixtures for the purposes of the present invention, are mixtures composed of at least 50% by weight, preferably at least 85% by weight, of n-alkanols, i.e. of primary unbranched aliphatic alcohols, where these have from 24 to 34 carbon atoms. The alkanol mixtures are preferably mainly composed of n-alkanols having an even number of carbon atoms.

In one preferred embodiment of the present invention, alkanol mixtures comprise a total of at least 75% by weight of n-$C_{28}H_{57}$—OH and n-$C_{30}H_{61}$—OH.

In one particularly preferred embodiment of the present invention, alkanol mixtures comprise an amount in the range from 63 to 67% by weight, in particular 65% by weight, of octacosanol (n-$C_{28}H_{57}$—OH), an amount in the range from 10 to 15% by weight, in particular 12% by weight, of triacontanol (n-$C_{30}H_{61}$—OH), an amount in the range from 5 to 10% by weight, in particular 7% by weight, of hexacosanol (n-$C_{26}H_{53}$—OH).

Alkanol mixtures can moreover comprise a total of from 5 to 22% by weight, preferably a total of from 7 to 20% by weight, particularly preferably a total of from 10 to 15% by weight, of further n-alkanols, examples being tetracosanol (n-$C_{24}H_{49}$—OH), heptacosanol (n-$C_{27}H_{55}$—OH), nonacosanol (n-$C_{29}H_{59}$—OH), dotriacontanol (n-$C_{32}H_{65}$—OH), and tetratriacontanol (n-$C_{34}H_{69}$—OH).

Alkanol mixtures can comprise one or more organic substances as further substituents, examples being fatty acids, saturated or unsaturated, fatty acid esters of one or more of the abovementioned n-alkanols, sugars, or one or more proteins.

Alkanol mixtures used according to the invention can by way of example be prepared via mixing of the n-alkanols used. A further possibility is to prepare inventively used alkanol mixtures via joint reduction of mixtures of the corresponding fatty acids.

In one specific embodiment of the present invention, the inventively used alkanol mixtures are what is known as policosanol. Policosanol can be obtained by way of example via extraction from sugarcane wax and preferably via one or more further purification steps. By way of example, policosanol can be obtained via extraction with isopropanol and subsequent purification. Examples of suitable purification steps are oxidative treatment with inorganic or organic peroxide or with Cr(VI) compounds, and also filtration, in particular filtration over silica gel or aluminum oxide. Further suitable treatment steps are recrystallization from paraffins, in simple or fractionated form, for example from n-heptane and in particular cyclohexane or n-hexane.

For the purposes of the present invention, the term thermoplastic polymers includes not only homopolymers but also copolymers, terpolymers, etc., each of these having thermoplastic properties. Copolymers here can be random copolymers, block copolymers, and graft copolymers.

For the purposes of the present invention, examples of thermoplastic polymers are polyolefins, such as polyethylene and polypropylene, and also polyaromatics, such as polystyrene and styrene copolymers, e.g. SAN or ASA, and also polycarbonates, polymethyl methacrylate (PMMA), polyamides, polyesters, and preferably halogenated thermoplastic polymers, such as polyvinyl chloride (PVC), and very particularly preferably rigid PVC. The PVC can be PVC prepared via emulsion polymerization (EPVC whose average particle diameter is from 1 to 2 μm), PVC prepared via suspension polymerization (SPVC whose average particle diameter is from 50 to 200 μm), PVC prepared via suspension polymerization with addition of emulsifier (MSPVC whose average particle diameter is from 5 to 10 μm), or PVC prepared by bulk polymerization (MPVC).

Particular preference is given to transparent thermoplastic polymers, such as transparent polystyrene, transparent polycarbonate, and in particular transparent polyvinyl chloride.

The inventive process starts from thermoplastic polymer, preferably solid thermoplastic polymer, particularly preferably solid polyvinyl chloride, in particular rigid PVC. Very particular preference is given to rigid PVC whose K value is in the range from 55 to 70, determined at 25° C. on a solution of 1 g of pure polyvinyl chloride in cyclohexanone, also termed rigid PVC for the purposes of the present invention. Polyvinyl chloride is prepared via polymerization of vinyl chloride, for example in bulk, in suspension or in emulsion, and, if appropriate, mixing with one or more plasticizers. The proportion of plasticizer can be in the range from 0.01 to 12 phr (parts per hundred resin), preferably from 0.1 to 8 phr, where for the purposes of the present invention parts means parts by weight and resin means pure polyvinyl chloride. The term pure polyvinyl chloride here means the relevant polyvinyl chloride without any additives used during processing, examples being plasticizers, stabilizers, auxiliaries from synthesis of the PVC, e.g. protective colloids or emulsifiers, UV stabilizers, or lubricants.

Thermoplastic polymers can comprise one or more additives, examples being antiblocking agents or antioxidants.

PVC, and in particular rigid PVC, generally comprises one or more additives, an example being plasticizer. Examples of suitable plasticizers which may be comprised within polyvinyl chloride and in particular within rigid PVC are dialkyl dicarboxylates, dibenzyl dicarboxylates, triesters of phosphoric acid, triesters of tricarboxylic acids, and epoxidized oils and esters.

Examples of suitable dialkyl dicarboxylates are in particular di(2-ethylhexyl) adipate, di(2-ethylhexyl) azelate, and di(2-ethylhexyl) sebacate, di(2-ethylhexyl) phthalate, di(2-ethylhexyl) terephthalate, diisooctyl phthalate, diisononyl phthalate, diisodecyl phthalate, di-n-tridecyl phthalate, di-n-undecyl phthalate, phthalic diesters of linear $C_7$-$C_{11}$ alkanol mixtures (abbreviated to 711-phthalates), n-butyl benzyl phthalate, and n-butyl n-octyl phthalate.

Examples of suitable triesters of phosphoric acid are in particular tri-n-octyl phosphate, cresyl diphenyl phosphate, triphenyl phosphate, tricresyl phosphate, and tri(2-ethylhexyl) phosphate.

Examples of suitable triesters of tricarboxylic acids are tri-$C_6$-$C_{11}$-alkyl citrates, triesters of 1,2,4-benzenetricarboxylic acid (triesters of trimellitic acid, trimellitates), in particular tri(2-ethylhexyl) 1,2,4-benzenetricarboxylate and triisooctyl 1,2,4-benzenetricarboxylate.

Examples of suitable epoxidized oils and esters are in particular epoxidized soybean oil, epoxidized linseed oil, and epoxystearate.

Examples of polymeric plasticizers are polyesters, obtainable via condensation of aliphatic dicarboxylic acids, such as azelaic acid or sebacic acid, with aliphatic α,ω-diols, such as 1,6-hexanediol or 1,4-butanediol.

For the purposes of the present invention, the term rigid polyvinyl chloride comprises not only homopolymers of vinyl chloride but also copolymers of vinyl chloride with from 0 to 30% of another monomer, e.g. vinyl acetate, or acrylate, such as methyl acrylate, and also postchlorinated PVC in which the relevant homopolymer of vinyl chloride has been posttreated with chlorine (the term used being CPVC), the chlorine content of these therefore being higher than in "untreated" PVC. The softening point of CPVC is higher than that of untreated PVC.

The K value of polyvinyl chloride used in the inventive process is in the range from 55 to 70, determined at 25° C. on a solution of 1 g of pure polyvinyl chloride in cyclohexanone.

In one embodiment of the present invention, polyvinyl chloride used in the inventive process has branching points, and specifically about 3 to 10 branching points per 1000 carbon atoms.

In one embodiment of the present invention, polyvinyl chloride used in the inventive process is in particulate form, for example in the form of powder or in the form of pellets.

Polyvinyl chloride can comprise one or more further additives. Examples of further suitable additives are inorganic or organic stabilizers, costabilizers, UV stabilizers, such as hydroxybenzophenones, antistatic agents, biostabilizers, such as fungicides, bactericides, and algicides, antioxidants, e.g. Ionol, bisphenol A, sterically hindered amines, such as "HALS" compounds, pigments, e.g. $TiO_2$, carbon black, $Fe_3O_4$, $Fe_2O_3$, monoazo pigments, phthalocyanines, dyes, e.g. azo dyes, anthracene, optical brighteners, fillers, e.g. chalk, dolomites, carbon blacks, silicates, kaolin, talc, asbestos, wollastonites, $SiO_2$, aluminum hydroxides, wood flour, glass fibers, and also blowing agents, kickers, inhibitors, light stabilizers, heat stabilizers, impact modifiers. Examples of suitable inorganic stabilizers that may be mentioned are metal soaps, e.g. salts of barium, lead, tin, and calcium, and also dibutyl- and dioctyltin compounds. Particular lead stabilizers that may be mentioned are 2 $PbO.PbHPO_3$, 3 $PbO.PbSO_4$, 4 $PbO.PbSO_4$, x $PbO.PbY$, where x is a whole number in the range from 1 to 4, and is preferably 2, and Y is selected from maleate, fumarate, phthalate, salicylate, stearate, $Pb[St]_2$, where St=stearate, preferably 4 $PbO.PbSO_4$, $PbCO_3$, $Pb[St]_2$, and x $PbO.PbY$.

$(CH_3)_2Sn(S—CH_2CH_2—O—CO—C_{11}H_{23})_2$, n-$Bu_xSn(S—CH_2CH_2—O—C_8H_{17})_{4-x}$, (iso-$C_8H_{17})_xSn(S—CH_2CH_2—O—CO—C_8H_{17})_{4-x}$, n-$Bu_2Sn[St]_2$, n-$Bu_2Sn$ maleate, and n-$Bu_2Sn(O—CO—CO—C_{11}H_{23})_2$ are particularly suitable tin stabilizers.

Example of a suitable Ca/Zn stabilizer is Ca/Zn stearate and $Zn(O—CO—R)_2 + Ca(O—CO—R)Cl$, where R is selected from n-$C_{17}H_{35}$ and n-$C_{11}H_{23}$. Examples of suitable organic stabilizers are uracils, aminocrotonates, dihydropyridines, ureas, or 2-phenylindole. Examples of suitable costabilizers are β-dicarbonyl compounds.

In one embodiment of the present invention, the inventive process is carried out in a kneader, or extruder, or on mixing rolls, preferably in an extruder.

In one embodiment of the present invention, thermoplastic polymer, and in particular PVC, is mixed with further additives, and specifically prior to, during, or after the processing with alkanol mixture. Examples of suitable additives are inorganic or organic stabilizers, costabilizers, UV stabilizers, such as hydroxybenzophenones, antistatic agents, biostabilizers, antioxidants, pigments, dyes, fillers, blowing agents, kickers, inhibitors, light stabilizers, heat stabilizers, impact modifiers.

In one embodiment of the present invention, the mixing is achieved via extrusion or kneading. For the extrusion process, by way of example, a single-screw extruder or a twin-screw extruder can be used. In the case of PVC as thermoplastic polymer, for example, temperatures at which the extrusion process can be carried out are up to 190° C. If the intention is to process a different thermoplastic polymer, a different processing temperature can be selected in accordance with the melting point.

In one embodiment of the present invention, profiles are extruded and produced, preferably window profiles, or pipes. In one preferred embodiment of the present invention, one or more foils are extruded and produced. In another preferred embodiment of the present invention, hollow products, for example bottles, are extruded and produced.

In one embodiment of the present invention, the mixing is achieved via extrusion and injection moldings are then produced with the aid of an injection-molding machine, examples being curved pipe adaptors or curved pipe connectors.

In one preferred embodiment of the present invention, the mixing is achieved via calendering, and examples of the products produced are sheets or films or foils, in particular transparent films or foils.

In one embodiment of the present invention, the material is kneaded after the mixing process described above, for example at a temperature in the range from 150 to 190° C. if PVC is the thermoplastic polymer. If the intention is to process a different thermoplastic polymer, a different processing temperature can be selected in accordance with the melting point.

The present invention also provides processed thermoplastic polymers, in particular PVC, comprising an amount in the range from 0.01 to 1% by weight, preferably in the range from 0.1 to 0.5% by weight, of mixture, comprising a total of at least 50% by weight of n-alkanols, selected from n-$C_{24}$-$C_{34}$ alkanols, also termed alkanol mixture for the purposes of the present invention. Alkanol mixtures have been defined above.

In one embodiment of the present invention, alkanol mixtures are those comprising a total of at least 75% by weight of n-$C_{28}H_{57}$—OH and n-$C_{30}H_{61}$—OH, based on the alkanol mixture. Alkanol mixtures are particularly preferably policosanol.

Inventive processed thermoplastic polymers and in particular inventive PVC exhibit very good transparency and have very good suitability for the production of sheet-like products or hollow products, e.g. bottles, in particular for the production of transparent sheets or films.

The present invention further provides profiles, in particular window profiles, and also foils or injection moldings, obtainable from inventive processed thermoplastic polymer, and in particular from inventive processed polyvinyl chloride.

The present invention further provides the use of inventive processed thermoplastic polymers for the production of sheet-like products or of hollow products.

The present invention further provides the use of inventive processed thermoplastic polymers for the production of profiles, in particular of window profiles.

Inventive examples are used to illustrate the invention.

I. Obtaining Policosanol

Policosanol was obtained via extraction of sugarcane waste with isopropanol and subsequent recrystallization from n-hexane. This gave a pale gray pulverulent mass (about 1 kg/ton of sugarcane). The resultant policosanol comprised 66% by weight of octacosanol, 12% by weight of triacontanol, 7% by weight of hexacosanol, and also in each case less than 5% by weight of tetracosanol, heptacosanol, nonacosanol, dotriacontanol, and tetratriacontanol.

II. Processing of Rigid Polyvinyl Chloride

The rigid polyvinyl chloride used in each case was a PVC whose K value was 68, hereinafter also termed (PVC. 1).

The following were in each case combined at 20° C. in a Henschel mixer and mixed with one another (4000 rpm):

100 phr of (PVC. 1), 1 phr of methyl methacrylate whose K value was 115 (commercially available as Vinuran® 3833), 3 phr of a 1:1 mixture (molar ratio) of Ca/Zn stearate, 0.8 phr of di-n-$C_{16}$-alkyl phthalate, 0.25 phr of ω-hydroxystearic acid, and policosanol from Example I. according to Table 1. The temperature rose during the mixing process to 120° C. The mixture was stirred for about 5 minutes at 120° C., and the stirrer rotation rate was reduced here in such a way that the temperature remained constant, and the mixture was then permitted to cool to room temperature. The mixture was then in each case kneaded by a Brabender kneader mill (Plasti-Corder W 50). Kneading temperature 160°, applied weight 5 kp, rotation rate 40 rpm.

Plastification time is always determined in minutes.

TABLE 1

Plastification times for inventive rigid PVC and comparative PVC in minutes

| Policosanol or oxidate | phr 0.3 | phr 0.6 |
|---|---|---|
| Ca/Zn-stabilized (PVC.1) | 10.5 | 14.0 |
| Ca/Zn-stabilized (compPVC.2) | 11.0 | 14.5 |
| Ca/Zn-stabilized (compPVC.3) | 12.0 | 15 |
| Sn-stabilized (PVC.1) | 1.25 | 2 |
| Sn-stabilized (compPVC.2) | 3.0 | 3.75 |
| Sn-stabilized (compPVC.3) | 3.75 | 4.5 |

Comparative experiments were in each case carried out with a comparative PVC, abbreviated to: (compPVC.2) which comprised, instead of policosanol, a partially oxidized homopolymeric polyethylene ("oxidate") whose melting point was 102° C. and whose density was 0.95 g/cm³, whose $M_n$ was 5400 g/mol, whose kinematic melt viscosity v at 120° C. was 320 mm²/s, and whose acid number was 17 mg KOH/g. This type of partially oxidized homopolymeric polyethylene was prepared via partial air-oxidation of a homopolymeric polyethylene whose melting point was 108° C., whose density was 0.92 g/cm³, and $M_n$ was 5400 g/mol.

Further comparative experiments were in each case carried out with a further comparative PVC, abbreviated to: (compPVC.3) which comprised, instead of policosanol, a partially oxidized homopolymeric polyethylene ("oxidate") whose melting point was 103° C. and whose density was 0.96 g/cm³, whose $M_n$ was 2800 g/mol, whose kinematic melt viscosity v at 120° C. was 310 mm²/s, and whose acid number was 23 mg KOH/g. This type of partially oxidized homopolymeric polyethylene was prepared via partial air-oxidation of a homopolymeric polyethylene whose melting point was 108° C., whose density was 0.92 g/cm³, and $M_n$ was 5400 g/mol.

TABLE 2

Torque for inventive rigid PVC and comparative PVC in Nm

| Policosanol or oxidate | phr 0.3 | phr 0.6 |
|---|---|---|
| Ca/Zn-stabilized (PVC.1) | 48 | 45 |
| Ca/Zn-stabilized (compPVC.2) | 49 | 46 |
| Ca/Zn-stabilized (compPVC.3) | 49 | 48 |
| Sn-stabilized (PVC.1) | 70 | 82 |
| Sn-stabilized (compPVC.2) | 67 | 61 |
| Sn-stabilized (compPVC.3) | 55 | 71 |

Torque was determined using a Brabender Plastograph from Brabender OHG, Duisburg, described by G. Biedenkopft Kunststoff und Gummi, volume 5, 1966/67, Krausskopf-Verlag.

The transparency of inventive polyvinyl chloride, based on Ca/Zn-stabilized (PVC.1) or on Sn-stabilized (PVC.1) material was in each case excellent, whereas Ca/Zn-stabilized (compPVC.2) and Sn-stabilized (compPVC.2) material had marked haze.

Transparency was measured by means of an Ulbricht sphere and is listed in Table 3.

TABLE 3

| Transparency | | |
|---|---|---|
| | phr | |
| Policosanol or oxidate | 0.3 | 0.6 |
| Ca/Zn-stabilized (PVC.1) | 99 | 97 |
| Ca/Zn-stabilized (compPVC.2) | 88 | 68 |
| Ca/Zn-stabilized (compPVC.3) | 89 | 75 |
| Sn-stabilized (PVC.1) | 100 | 98 |
| Sn-stabilized (compPVC.2) | 90 | 72 |
| Sn-stabilized (compPVC.3) | 91 | 73 |

The invention claimed is:

1. A process for the processing of a thermoplastic polymer which comprises utilizing an additive mixture in the processing of the thermoplastic polymer in an amount in the range from 0.01 to 1% by weight and wherein the mixture comprises a total of at least a 75% by weight of n-$C_{28}H_{57}$—OH and n-$C_{30}H_{61}$—OH.

2. The process for the processing of a thermoplastic polymer according to claim 1 which comprises utilizing the mixture in an amount in the range from 0.1 to 0.5% by weight and wherein the mixture comprises a total of at least 75% by weight of n-$C_{28}H_{57}$—OH and n-$C_{30}H_{61}$—OH.

3. The process according to claim 2, wherein the processing is carried out in a kneader, an extruder or on mixing rolls.

4. The process according to claim 2, wherein the thermoplastic polymer is PVC.

5. The process according to claim 3, wherein the thermoplastic polymer is PVC.

6. The process as claimed in claim 2, wherein the mixture is policosanol.

7. The process as claimed in claim 5, wherein the mixture is policosanol.

* * * * *